United States Patent [19]
Wold

[11] Patent Number: 5,724,589
[45] Date of Patent: Mar. 3, 1998

[54] DEVELOPMENT SYSTEM WITH A PROPERTY-METHOD-EVENT PROGRAMMING MODEL FOR DEVELOPING CONTEXT-FREE REUSABLE SOFTWARE COMPONENTS

[75] Inventor: Ivar Wold, Boston, Mass.

[73] Assignee: Borland International, Inc., Scotts Valley, Calif.

[21] Appl. No.: 542,505

[22] Filed: Oct. 13, 1995

[51] Int. Cl.$^6$ ........................................... G06F 9/44
[52] U.S. Cl. .................. 395/701; 395/683; 395/685
[58] Field of Search .......................... 395/701, 683, 395/685

[56] References Cited

U.S. PATENT DOCUMENTS

| | | | |
|---|---|---|---|
| 4,710,763 | 12/1987 | Franke et al. | 340/723 |
| 4,733,354 | 3/1988 | Potter et al. | 364/415 |
| 4,821,211 | 4/1989 | Torres | 364/521 |
| 4,831,580 | 5/1989 | Yamada | 364/900 |
| 4,866,634 | 9/1989 | Reboh et al. | 364/513 |
| 4,912,669 | 3/1990 | Iwamoto et al. | 364/900 |
| 4,956,773 | 9/1990 | Saito et al. | 364/200 |
| 4,982,344 | 1/1991 | Jordan | 364/521 |
| 4,984,180 | 1/1991 | Wada et al. | 364/518 |
| 5,008,810 | 4/1991 | Kessel et al. | 364/200 |
| 5,047,960 | 9/1991 | Sloan | 364/523 |
| 5,091,868 | 2/1992 | Pickens et al. | 395/148 |
| 5,093,914 | 3/1992 | Coplien et al. | 395/700 |
| 5,179,652 | 1/1993 | Rozmanith et al. | 395/155 |
| 5,208,907 | 5/1993 | Shelton et al. | 395/149 |
| 5,265,206 | 11/1993 | Shackleford et al. | 395/200 |
| 5,327,562 | 7/1994 | Adcock | 395/700 |
| 5,339,438 | 8/1994 | Conner et al. | 395/700 |
| 5,361,350 | 11/1994 | Conner et al. | 395/600 |
| 5,371,891 | 12/1994 | Gray, et al. | 395/700 |
| 5,442,793 | 8/1995 | Christian et al. | 395/700 |
| 5,481,708 | 1/1996 | Kukol | 395/700 |
| 5,485,617 | 1/1996 | Stutz et al. | 395/700 |
| 5,487,141 | 1/1996 | Cain et al. | 395/135 |
| 5,497,491 | 3/1996 | Mitchell et al. | 395/700 |
| 5,522,071 | 5/1996 | Guillen et al. | 395/650 |
| 5,600,838 | 2/1997 | Guillen | 395/683 |
| 5,634,124 | 5/1997 | Khoyi et al. | 395/614 |
| 5,659,751 | 8/1997 | Meninger | 395/685 |

OTHER PUBLICATIONS

*Microsoft Visual Basic Version 3.0 Programmer's Guide, Chapter 2: Your First Visual Basic Application*, Microsoft Corp., 1993, pp. 15–30.

Gehani, N., *High Level Form Definition in Office Information Systems*, The Computer Journal, vol. 26, No. 1, Feb. 1983, pp. 52–59.

Shu, Nan C., *Visual Programming*, Van Nostrand Reinhold Company, 1988, pp. 16–31, 142–147, 150–151, 202–209, 222–229, 234–237, 264–283.

(List continued on next page.)

*Primary Examiner*—Alvin E. Oberley
*Assistant Examiner*—Kakali Chaki
*Attorney, Agent, or Firm*—John A. Smart

[57] ABSTRACT

A development system providing a property-method-event programming (PME) model for developing context-free reusable software components is described. Despite the absence of any C++ language support for events, the present invention provides a type-safe "wiring" mechanism—one using standard C++ to dispatch an event, raised by one object (the "event source"), to a method of another object (the "event sink"), with the requirement that the event source does not need to know the class of the event sink. As a result, the system allows developers to create C++ software components which can be connected together without the components having to know anything about the makeup of the component to which it is connected. Thus, developers can create pre-packaged, re-usable software components which can simply be "plugged into" a design—all accomplished within the confines of the standard C++ programming language (i.e., without having to employ proprietary extensions).

30 Claims, 6 Drawing Sheets

OTHER PUBLICATIONS

Smith, David N., *Visual Programming in the interface Construction Set*, IEEE, 1988, pp. 109–120.

Pezold, C., *Dynamic Data Exchange (DDE)—Chapter 17*, Programming Windows, Second Edition, Microsoft Press, 1990, pp. 809–840.

Linthicum, D., *RADical Development*, PC Magazine, Nov. 8, 1994, pp. 153–157, 162, 168, 170, 174, 176, 186–184, 188–193, 195, 198, 203–205, 209–210.

Merriam, Rud, *Drag & Drop*, Windows Tech Journal, Jan. 1992, pp. 79–80.

Shepard et al., *A Visual Software Process Language*, Communications of the ACM, vol. 35, No. 4, Apr. 1992, pp. 37–44.

Butterworth, M., *Forms Defination Methods*, 5th Annual Conference on Computers and Communication, Mar. 1986, pp. 708–712.

Miyao et al., *Visualized and Modelss Programming Enviroment for Form Manipulation Language*, IEEE, 1989, pp. 99–104.

DeMaria, Rusel & Fontane, George, *Working With dBase Mac*, Brady Books, 1988, pp. 94–134, 135, 155–183.

Linthicum, D., *Defending OOP with VisualAge*, DBMS, Aug. 1994, pp. 22, 24, 75.

Varhol, Peter, *Visual Programming's Many Faces*, BYTE, Jul. 1994, pp. 187–188.

Mandelkern, D., *Visual Programming*, Object Magazine, Sep.–Oct. 1992, pp. 39–43.

Chin, et al., *Distributed Object–Oriented Programming Systems*, ACM Computing Surveys, vol. 23, No. 1, Mar. 1991, pp. 91–124.

Liu, et al., *Microcomputer Systems: The 8086/8088 Family*, Prentice–Hall, 1986, pp. 26–39 and 155–160.

DEVELOPMENT SYSTEM WITH A PROPERTY-METHOD-EVENT PROGRAMMING MODEL FOR DEVELOPING CONTEXT-FREE REUSABLE SOFTWARE COMPONENTS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to software development systems and, more particularly, to assisting a user of such systems with creating reusable software components, especially C++ software components.

Prior to the early 1960's electrical devices were constructed using so-called "discrete" components—that is, components with very basic, simple functionality, such as resistors, capacitors, inductors, transistors, and the like. Building complex electrical assemblies was a major task, since a designer would usually have to design and implement certain functional elements, like simple amplifiers and logic circuits, from scratch in every new design. It is usually impossible to test each internal functional element (e.g., resistor) as independent units. For a given functional element to work, every other component around it (i.e., connected to it, directly or indirectly) also had to work. Much of the effort of designing, constructing, and debugging complex electronic assemblies, therefore, was spent creating and debugging these basic functional elements, over and over again.

With the advent of integrated circuits, designers were freed from the drudgery of re-implementing and re-testing basic functionality. Since the designer could focus his or her creative energies on designing new functionality based on a library of available, reusable components, far more complex designs became possible. At the same time, designers realized increased reliability, decreased costs, and improved time-to-market. Today, of course, it is taken for granted that sophisticated electronic assemblies can be cheaply and reliably constructed using "off-the-shelf" components.

The construction of software programs is, in a sense, similar to the construction of electronic devices. In both case, "components" are combined to produce a final product. Also in both cases, the components tend to have a high degree of interdependency: the functionality of any one particular component is due, in no small part, to the other components around it. Despite the tremendous productivity gains realized with integrated circuits, present-day software developers are doing the software-equivalent of "discrete" component development, i.e., by using the C/C++ programming language and its basic runtime library. Although software developers have some functional libraries of reusable code which frees them from a certain amount of drudgery, present-day software projects are typified by reimplementing a lot of basic functionality, from one project to the next. All told, present-day software development seems to be "stuck" where electronics was, somewhere between the 1960's and 1970's.

Some progress has been made towards addressing this problem. In the context of C++ development tools, for instance, "application frameworks" are available which provide "reusable components," at least to an extent. Despite the wide availability of application frameworks, most software projects end up re-implementing even the most basic functionality, with very little actual re-use of existing code. Before examining reasons underlying this, it is first helpful to more fully develop the notion of what a "component" is.

A "component" is a functional entity which can be completely characterized by its inputs and outputs. As a result, it can be used, and therefore tested, as a unit, independently of the context in which the component will eventually be used. It follows, therefore, that if a component can be characterized only by its inputs and outputs, then the details of its internal implementation will be completely hidden from the user. This aspect allows the implementation of a component to evolve over time without affecting its intended use.

The "reuse" of source code, such as from an application framework, is not the same as having re-usable components. In particular, old, reused source code still has to be understood, compiled, and built as an integral part of a new design. A lot can go wrong even at this basic stage. Thus, despite the fact that reusable source code might exist as part of an application framework, that code must still be tested and debugged as an integral part of the overall new design. This is directly analogous to the way early electrical engineers would "re-use" old designs in new projects by literally cutting and pasting parts of old schematics into a new design. Although, with such an approach, one could save some design time by "re-using" one's old design, or someone else's design, the designer still had to fully understand, build, and test the entire new assembly as a whole, including all of the old designs.

When commercial C++ tools became widely available for software development in the mid-to-late 1980's, it appeared, at first glance, that the promise of reusable objects and components might, at long last, be fulfilled. In practice, however, this simply has not happened. Although few would doubt that C++ has helped create software with greatly increased complexity, there is general agreement in the industry that the promise of truly reusable components has largely remained unfulfilled. Some would even argue that C++ programs, with their attendant increased level of complexity, are generally less reusable than old, standard C programs.

Even with all of its object-oriented features, C++ really only helps one "create" software. It does little to help one with the use or re-use of that software. In a typical C++ object framework, the developer is provided with a programming model based on semifunctional "skeletons" or "base" classes, for the various "components" supported by the framework. The developer then needs to create "real" functioning components from these skeletons, usually by using the C++ inheritance mechanism. In effect, the designer starts by completing someone else's partial design. And to successfully complete such a process, the designer really needs to understand that design. The approach is characterized by "sub-classing" existing components, that is, adding real functionality to the "skeletons" which were provided by the framework. After completing this sub-classing process, the designer must still build and test the resulting "component" as part of his or her overall application. This is not very different from the cut-and-paste reuse of source code which has existed for some time. Simply put, present-day C++ frameworks do not provide fully functional, fully tested components which are ready for use without modification. A particular reason for this imitation is the fact that the C++ language really lets one create components with "inputs," in the form of C++ member functions, but there is no language-supported mechanism for "outputs." As a result, it is commonplace to create C++ components which make very specific assumptions about their surrounding environment. Such components become context bound, with severe restrictions on their use.

Consider a user interface control, such as a screen button, edit control, scroll bar, or the like. These serve as examples of components which, when implemented in typical C++ object frameworks, become context bound. A button object, for instance, would be implemented in a fashion which expressly assumes that it will also be contained in another object which is derived from some class, say, a TControlEvents class. In typical implementation, these controls now communicate events to their containing object by "talking" directly to the "inputs" of this known TControlEvents object. Although the particular scheme varies from one C++ application framework to another, the end result is a set of controls which are context bound—they are constrained to communicate their events only through the methods defined by the containing object (here, the TControlEvents object). Clearly, new events cannot be added to existing controls. As a result, new controls with a different set of events cannot be used in the "old" container. For similar reasons, other containers—those which are not derived from the TControlEvents class—cannot be used at all.

Imagine the problems which would be encountered by an electrical engineer if a given electronic component could only be used as part of those assemblies whose "type" (i.e., detailed layout) were known at the time the component was created. For instance, what if a given electronic component could only be used on 3×5 inch circuit board, made of fiberglass-epoxy resin, positioned in the lower left corner of the circuit board, and it could only work correctly if the component to its left is a 4.7K resistor. Clearly today, such limitations would simply not be tolerated by electrical engineers. Instead, electronic components are designed to function in completely arbitrary electronic assemblies, as long as their inputs and outputs are "hooked up" correctly, that is, used in a context-free fashion.

It is highly desirable to have the same kind of freedom for software components, particularly in the context of the C++ programming language. More particularly, since C++ is the programming language of choice for most developers today, it is highly desirable to provide the ability to create pre-packaged, fully-tested C++ software components which can be simply "plugged in" to a design. Since the individual C++ tool vendor does not have the luxury of re-defining the C++ language (at least in a manner which is acceptable to standards-conscious customers), this should be accomplished within the confines of the standard C++ programming language (i.e., without adding proprietary extensions). The present invention fulfills this and other needs.

SUMMARY OF THE INVENTION

The present invention comprises a development system providing a property-method-event programming model for developing context-free reusable software components. More particularly, the system allows developers to create pre-packaged, fully-tested C++ software components which can be simply "plugged in" to a design—all accomplished within the confines of the standard C++ programming language.

Despite the absence of any C++ language support for events, the present invention provides a type-safe "wiring" mechanism—one using standard C++ to dispatch an event, raised by one object (the "event source"), to a method of another object (the "event sink"), with the requirement that the event source does not need to know the class of the event sink. In this manner, the system of the present invention allows C++ software components to be connected together in a context-free manner, thereby providing "closure."

"Closure" is the notion of binding or connecting "where to call" with "who is being called." Taken a step further, "closure," in accordance with the present invention, is the notion of binding a function pointer (i.e., where to call) with an object pointer (i.e., "who" is being called). Here, a closure may be thought of as a double pointer. It includes a pointer to an address to call together with a pointer to an address of an object to whom that address belongs. If a system has closure, one can specify a component completely in terms of its inputs and outputs. In particular, the user of that component need not know the class of the component to use it.

Given a language environment which does not have closure (e.g., C++), the issue remains how does one connect an "event source" to an "event sink." In the system of the present invention, this is accomplished by use of a dispatcher function which is given sufficient information so that it can "dispatch to" (i.e., call on to) the actual function (i.e., event sink) on the object, thereby achieving closure. In this manner, components of an arbitrary nature can be dealt with in the simple matter of "talking to" their inputs and "reacting to" their outputs, all without having to know anything about the makeup of a particular component. Moreover, the approach provides an early-bound, type-safe event model in standard C++.

The static member function itself serves as the dispatcher; it includes code which calls virtual member functions of the class. The static member function belongs to the class and, therefore, has knowledge of the real (i.e., workhorse) methods in the class. Thus at runtime, the static member function can dispatch an event to the appropriate member function for the class. Since the dispatcher member function is declared static, no problem exists with address resolution at compile time.

Further, the pointer-to-a-pointer-to-a-function 531 serves double duty. By passing it as a parameter (e.g., first parameter) to the static member dispatch function 517, one now also has a pointer to the object (i.e., the object's "this" pointer). In particular, once inside of the static function, the system knows at what offset the static member function is within the object. With this knowledge and with the address of the pointer-to-a-pointer-to-a-function, the system can easily calculate the "this" pointer for the Object 510. In other words, given a static function and a pointer to that function, it is a straightforward matter to compute the outer address for the object which contains that function. In an exemplary environment, the address for the object itself (i.e., its "this" pointer) is extracted using an "outer" macro.

Components may be connected together at runtime by use of "attach" and "detach" methods. The attached and detached methods take as parameters an event source and a corresponding event sink for a pair of components which are desired to be connected. In this manner, the two may be connected together in an early-bound fashion (e.g., at compile time). In this manner, a "click" event occurring at the button can easily be attached to an "on click" handler of the form. The connection can be done by either party. Alternatively, the connection can be made by a third party component, which itself has no knowledge of the internal workings of either object being connected together.

DETAILED DESCRIPTION OF A PREFERRED EMBODIMENT

The following description will focus on a preferred embodiment of the present invention which is operative in a C++ development environment supporting development of C++ application software operative in a Windows-based environment. The present invention, however, is not limited to any particular application or any particular environment. Instead, those skilled in the art will find that the system and methods of the present invention may be advantageously applied to a variety of platforms and environments. Therefore, the description of the exemplary embodiments which follows is for purposes of illustration and not limitation.

General Architecture

A. System Hardware

Figure 1A:
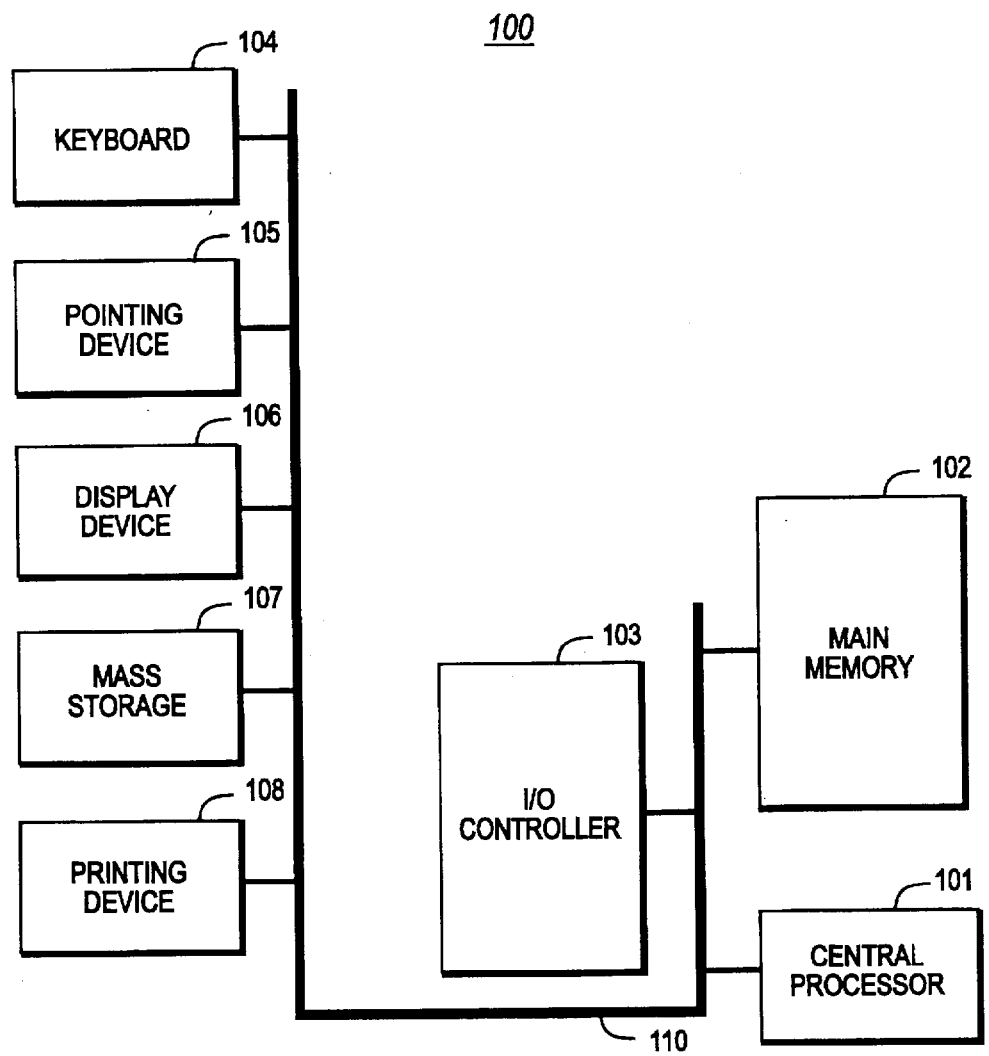
FIGS. 1A and 1B represent a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Processor 101 includes or is coupled to a cache memory for storing frequently accessed information; cache memory may be an on-chip cache or external cache, as is known in the art. Additional input/output devices, such as a printing device 108, may be provided with the system 100 as desired. As shown, the various components of the system 100 communicate through a system bus 110 or similar architecture.

B. System Software

Figure 1B:
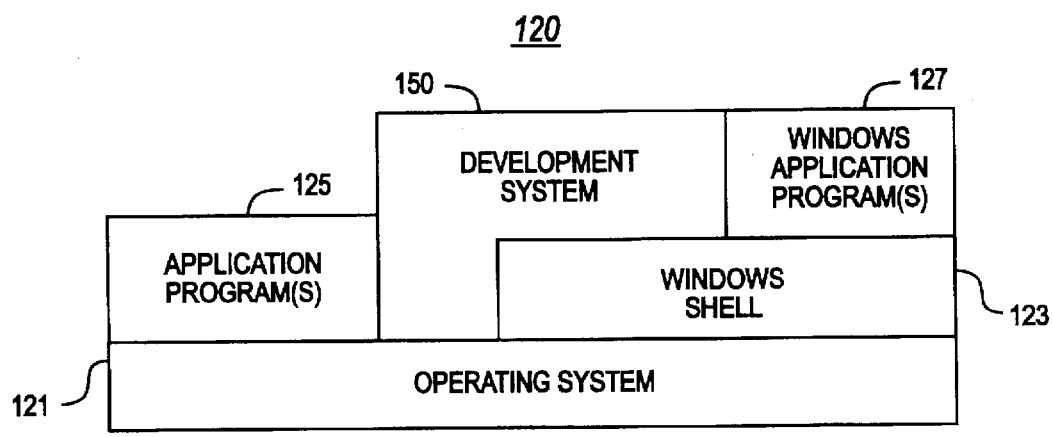

Illustrated in FIG. 1B, a computer software system 120 is provided for programming the operation of the computer system 100. Software system 120, which is stored in system memory 102 and/or on disk memory 107, includes a kernel or operating system (OS) 121 and a windows shell or interface 123. One or more application programs, such as application program(s) 125 or windows applications program(s) 127, may be "loaded" (i.e., transferred from storage 107 into memory 102) for execution by the system 100. OS 121 and shell 123, as well as application software 125, 127 include an interface for receiving user commands and data and displaying results and other useful information. Software system 120 also includes a development system 150 of the present invention for developing system and application programs. As shown, the development system 150 includes components which interface with the system 100 through windows shell 123, as well as components which interface directly through OS 121.

In a preferred embodiment, the system 100 includes an IBM-compatible personal computer, available from a variety of vendors (including IBM of Armonk, N.Y.). Operating system 121 is MS-DOS and shell 123 is Microsoft® Windows, both of which are available from Microsoft Corporation of Redmond, Wash. Alternatively, the system 100 may be implemented in other platforms, including Macintosh, UNIX, and the like. Development systems 150 include Borland® C++, available from Borland International of Scotts Valley, Calif. Application software 125, 127, on the other hand, can be any one of a variety of application software, including word processing, database, spreadsheet, text editors, and the like. The C++ programming language itself is documented in the technical, trade, and patent literature; see e.g., Ellis M. and Stroustrup B., *The Annotated C++ Reference Manual*, Addison-Wesley, 1990, the disclosure of which is hereby incorporated by reference.

C. Development System

Figure 2:
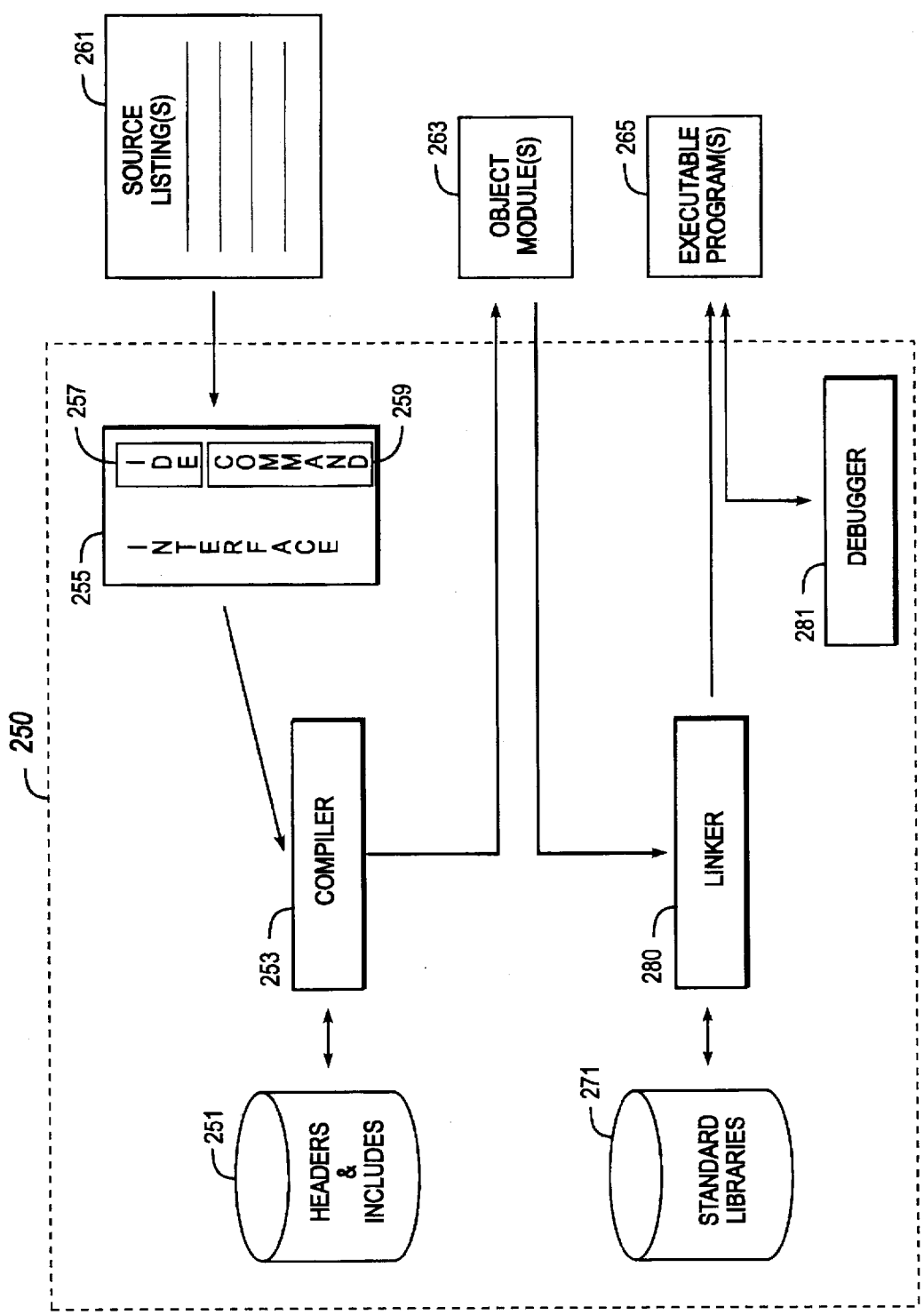
FIG. 2 is a block diagram of a development system of the present invention which includes a compiler, a linker, and an interface.

Shown in further detail in FIG. 2, the development system 250 of the present invention includes a compiler 253, a linker 280, and an interface 255. Through the interface, the developer user supplies source modules 261 to the compiler 253. Interface 255 includes both command-line driven 259 and Integrated Development Environment (IDE) 257 interfaces, the former accepting user commands through command-line parameters, the latter providing menuing equivalents thereof. After tokenizing and parsing the source code or listings 261 and headers/includes files 251, the compiler 253 "compiles" or generates object module(s) 263. In turn, linker 280 "links" or combines the object modules 263 with libraries 271 to generate program(s) 265, which may be executed by a target processor (e.g., processor 101 of FIG. 1A). The standard libraries 271 include previously-compiled standard routines, such as graphics, I/O routines, startup code, math libraries and the like. The user developer may designate other libraries (e.g., custom libraries) whose code is to be linked into the target executable.

In a preferred embodiment, the compiler includes Borland® C++ compiler. A description of the general operation of development system 250 is provided with Borland® C++, available directly from Borland International. In particular, the reader may consult the following manuals: (1) *Borland C++ User's Guide*, (2) *Borland C++ Programmer's Guide*, and (3) *Borland C++ Tools and Utilities Guide*, all available from Borland International. For a general introduction to the construction and operation of compilers, see Fischer et al., *Crafting a Compiler with C*, Benjamin/Cummings Publishing Company, Inc., 1991. The disclosures of each of the foregoing are hereby incorporated by reference.

A debugging module 281 is provided for tracking and eliminating errors in the programs 265. During compilation of a program, a developer user may specify that the program is to be compiled with "debug info." Debug info is used by the debugger 281 for tracking execution of the debuggee with the corresponding source listings. The general construction and operation of debuggers is well described in the technical, trade, and patent literature. See e.g., Pietrek, M., *Writing a Windows Debugger*, Windows/DOS Developer's Journal, pp. 6–12, June 1992. Particular user operation of the debugger 281 is described in *Borland C++: User Guide*, Chapter 6: Using the integrated debugger, Part No. BCP1240WW21770, Borland International, 1993. Formats for debug info are described in the technical literature; see e.g., *Borland Languages: Open Architecture Handbook*, Part No. 14MN-RCH01-10, Borland International, 1991. The disclosures of the foregoing references are hereby incorporated by reference.

Context-free Reusable Software Component in C++

A. General

The following describes methods of the present invention for creating context-free reusable software components in a C++ development environment, such as in the system 250. Initially, however, it is helpful to characterize the general nature of "components."

Figure 3:
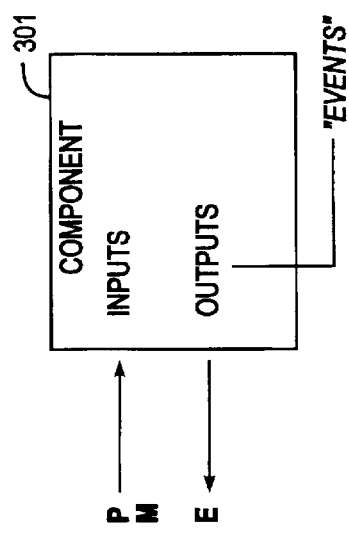
FIG. 3 is a block diagram of a "black box" component, which may be characterized by its inputs and outputs.

Consider a "black box" component, for instance, as shown in FIG. 3. Component 301 may be characterized by its inputs and outputs. In principle, a user of such a component need not know or be concerned about the "internals" which operate on the inputs to produce the outputs. In contrast, consider the C++ programming language, with its class hierarchy mechanism. Objects created from C++ classes tend to expose an enormous amount of detail of the internal workings. C++ objects, in essence, can be viewed as "white box" objects, not "black box" objects. Inputs into a C++ object are the methods defined for the class from which the object is created. At the level of its methods, the internal workings of the object need not be surfaced to its client or user. In other words, the individual steps which comprise the various methods can be maintained in a black box fashion from users. Properties of the object, which are typically set using property-access methods of the class, can also be viewed in this light. Specifically, the getting and setting of properties can be achieved in a manner which is transparent to a user.

The difficulty remains, however, how one effectively handles the outputs of a component or object. Further, what exactly is an "output"? In the context of software development, an "output" is typically treated as an "event." Briefly stated, an event is something which has happened (i.e., an occurrence of an event) inside the component that a user of that component needs to react to (or at least be apprised of). It is these "outputs" which comprise the bulk of the problem of C++ components: no simple way exists in C++ of connecting an output of one component or object to the input of another. Thus, in C++, "closure" is not provided.

B. Closure

Figure 4:
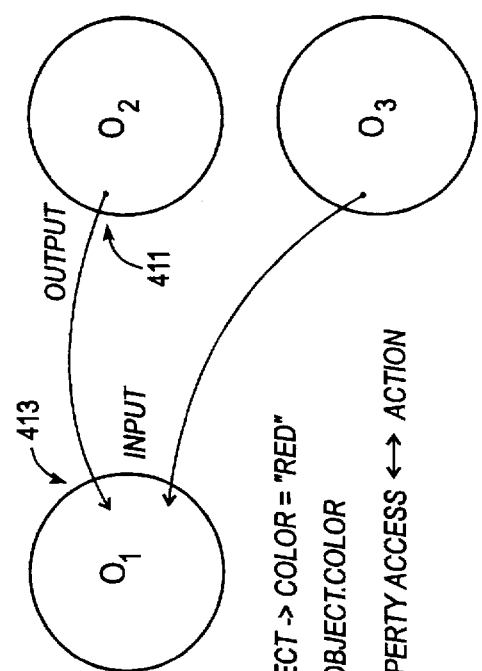
FIG. 4 is a block diagram illustrating the notion of "closure" among objects, that is, the notion of binding or connecting "where to call" with "who is being called."

"Closure" is the notion of binding or connecting "where to call" with "who is being called." Consider objects $O_1$, $O_2$, and $O_3$, shown in FIG. 4. Suppose it is desirable to connect two objects such that an output of object $O_2$ (shown at 411) can be connected to an input of object $O_1$ (shown at 413). Object $O_2$, for example, might be a screen button object wutg object $O_2$ being a form object containing that screen button. If the user clicked the button object, it would execute some input on the form object. Here, as is often the case, the "receiver" of an event is a container. In the example at hand, for instance, the form object "contains" the button object. It is not necessary, however, that the container be a physical container. Object $O_2$ may instead be a menu object with object $O_1$ being one of several objects which need to "listen" to menu events. In such a case, object $O_1$ does not contain object $O_2$, but it nevertheless has access to it. As also shown in the figure, object $O_1$ may have other connections, such as to object $O_3$.

Taken a step further, "closure," in accordance with the present invention, is the notion of binding a function pointer (i.e., where to call) with an object pointer (i.e., "who" is being called). Here, a closure may be thought of as a double pointer. It includes a pointer to an address to call together with a pointer to an address of an object to whom that address belongs. If a system has closure, one can specify a component completely in terms of its inputs and outputs. In particular, the user of that component need not know the class of the component to use it. Since C++ does not provide closure, however, the problem remains as to how to "wire" the outputs in a convenient way.

C. Event "source" and event "sink"

(1) General

Given a language environment which does not have closure (e.g., C++), the issue remains how does one connect an "event source" to an "event sink." In the system of the present invention, this is accomplished by use of a dispatcher function which is given sufficient information so that it can "dispatch to" (i.e., call on to) the actual function (i.e., event sink) on the object, thereby achieving closure. In this manner, components of an arbitrary nature can be dealt with in the simple matter of "talking to" their inputs and "reacting to" their outputs, all without having to know anything about the makeup of a particular component. Moreover, the approach provides an early-bound, type-safe event model in standard C++.

(2) Dispatcher

Figure 5:
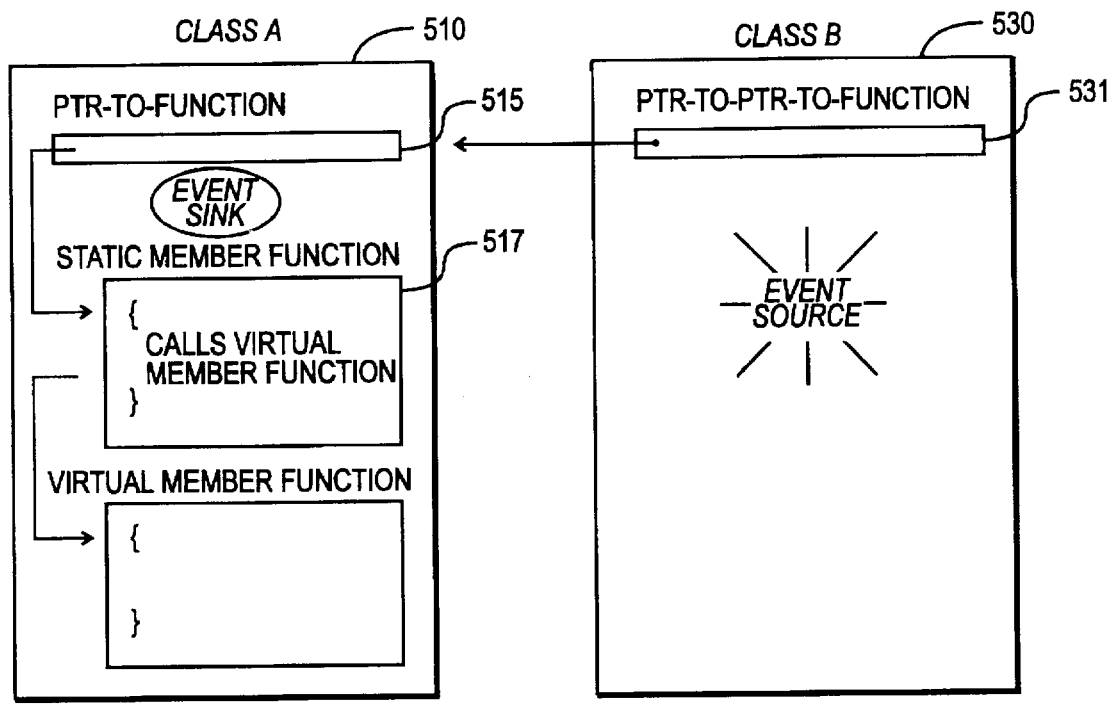
FIG. 5 is a block diagram illustrating a "dispatcher" method of the present invention, which is employed for connecting an event source to an event sink in an early-bound, type-safe event model.

As illustrated in FIG. 5, a "dispatcher" method of the present invention is employed for connecting an event source to an event sink in an early-bound, type-safe event model which may be implemented in standard C++. The figure illustrates two objects: Object 510 of Class A and Object 530 of Class B. In this example, it is desired that Object 530 be connected to Object 510, so that an event occurring at Object 530 (Event Source) is passed to Object 510 (Event Sink). Further, it is desired that Object 530 need not know any details of the Object 510 (and vice versa). In particular, the prior art approaches of inheritance or publishing interfaces is undesirable, as each approach surfaces internal details of an object.

Connection of the objects is achieved as follows. In Object 530, a pointer-to-a-pointer-to-a-function 531 is created. In other words, the object which has the event source stores the address to a location which stores a pointer (address) to a function in the object which has the event sink. Here, the pointer-to-a-function is stored in the Object 510 at 515. This pointer-to-function 515, in turn, points to a static member function, shown at 517. The reason that this member function is declared to be static (i.e., using the static C++ reserved word) is that its address can easily be discerned at compile time.

The static member function itself serves as the dispatcher; it includes code which calls virtual member functions of the class. The static member function belongs to the class and, therefore, has knowledge of the real (i.e., workhorse) methods in the class. Thus at runtime, the smile member function can dispatch an event to the appropriate member function for the class. Since the dispatcher member function is declared static, no problem exists with address resolution at compile time.

Further, the pointer-to-a-pointer-to-a-function 531 serves double duty. By passing it as a parameter (e.g., first parameter) to the static member dispatch function 517, one now also has a pointer to the object (i.e., the object's "this" pointer). In particular, once inside of the static function, the system knows at what offset the smile member function is within the object. With this knowledge and with the address of the pointer-to-a-pointer-to-a-function, the system can easily calculate the "this" pointer for the Object 510. In other words, given a static function and a pointer to that function, it is a straightforward matter to compute the outer address for the object which contains that function. In an exemplary environment, the address for the object itself (i.e., its "this" pointer) is extracted using an "outer" macro.

Components may be connected together at runtime by use of "attach" and "detach" methods. The attached and detached methods take as parameters an event source and a corresponding event sink for a pair of components which are desired to be connected. In this manner, the two may be connected together in an early-bound fashion (e.g., at compile time). In this manner, a "click" event occurring at the button can easily be attached to an "on click" handler of the form. The connection can be done by either party, that is, by either Object 530 or Object 510. Alternatively, the connection can be made by a third party component, which itself has no knowledge of the internal workings of Class A or Class B.

Complimenting the notion of attaching is "detaching." Consider a scenario where a component desires to listen to menu events. It can hook itself into the menu system. Once having observed the menu event of interest, however, it can then proceed to detach itself from the menu system, thereby allowing that component to skip a multitude of menu events which would otherwise be passed to it (and which it now has no interest in).

(3) One-to-many and Many-to-one relationships

As described above, the pointer-to-a-pointer-to-a-function 531 is the "event source." The static member function 517, on the other hand, is the "event sink." A complexity which arises, however, is that there may be many receivers or listeners for a single event. An example of such an instance is a form including a menu item object with several objects "listening" for a particular menu item event (e.g., "File|Open"). Alternatively, there may be many senders for a single receiver, such as a form including several screen button objects with one screen button event handler.

Figure 6:
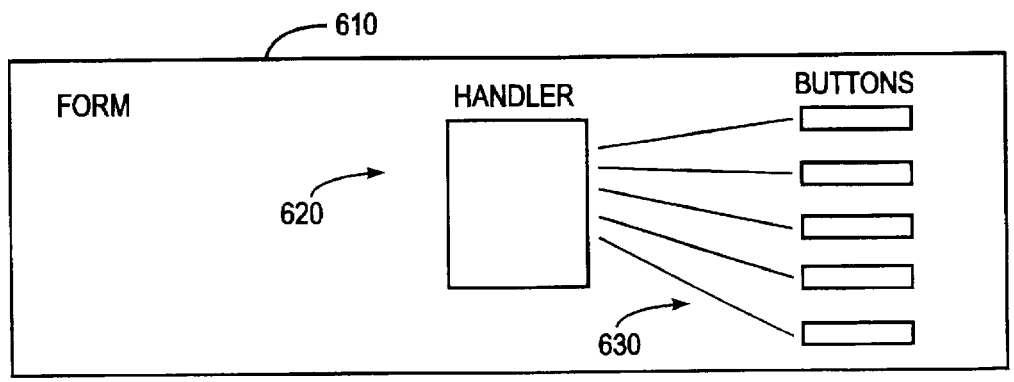
FIG. 6 is a block diagram illustrating a many-to-one scenario, which exists among a plurality of button objects having a single button handler.

FIG. 6 illustrates this many-to-one scenario. A form 610, for instance, may include a multitude of screen buttons (buttons 630). Events from the buttons themselves may, in turn, be processed by a single handler, shown as 620. As another example, consider a spreadsheet. Instead of creating an individual handler for each cell in the spreadsheet, a generalized cell handler is created for processing events occurring at cells. The handler is invoked with an event which includes sufficient information for identifying which cell the event occurred at. Thus, one-to-many and many-to-one relationships exist among components.

Figure 7:
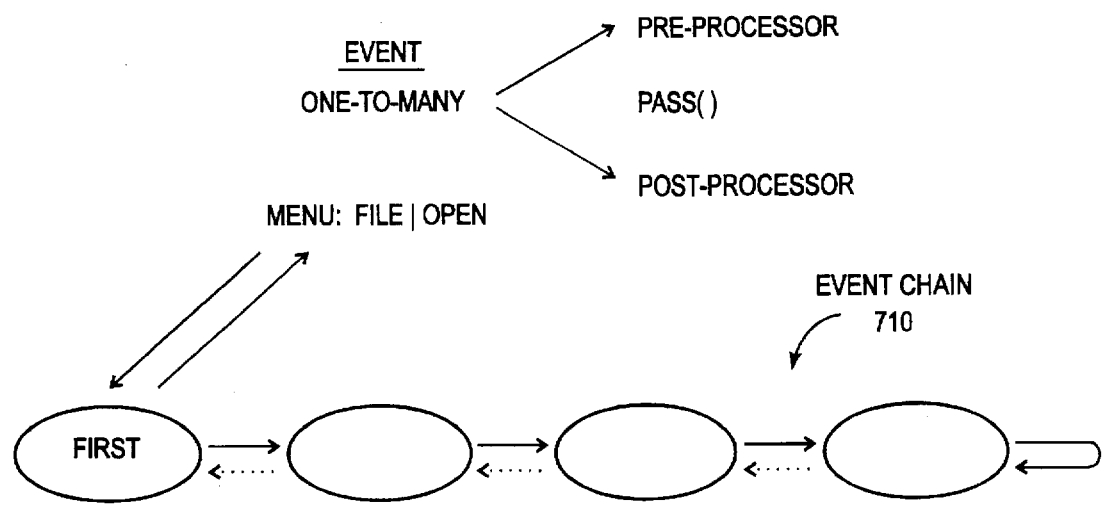
FIG. 7 is a block diagram illustrating a one-to-many scenario, which exists when the event of a menu selection is communicated to many receivers.

According to the present invention, events flow along a chain of "listeners"—an "event chain." As shown in FIG. 7, the event of a menu selection may have to go to many receivers. The event is, in effect, passed along an event chain 710 to successive objects, some of which may elect to act upon the event. At the end of the chain (i.e., after the last member), the event dies or, alternatively, is passed back up the chain to the original sender.

Certain objects may wish to act on the event only after other objects have been apprised of the event. In other words, an object might want to act on an event on its "return trip" of the event sequence. In a one-to-many scenario, message handling may be viewed as including both preprocessing and post-processing phases. Additionally, objects may elect to block a particular event from others further down in the chain. These NULL-task events are effectively discarded at this point.

Figure 8:
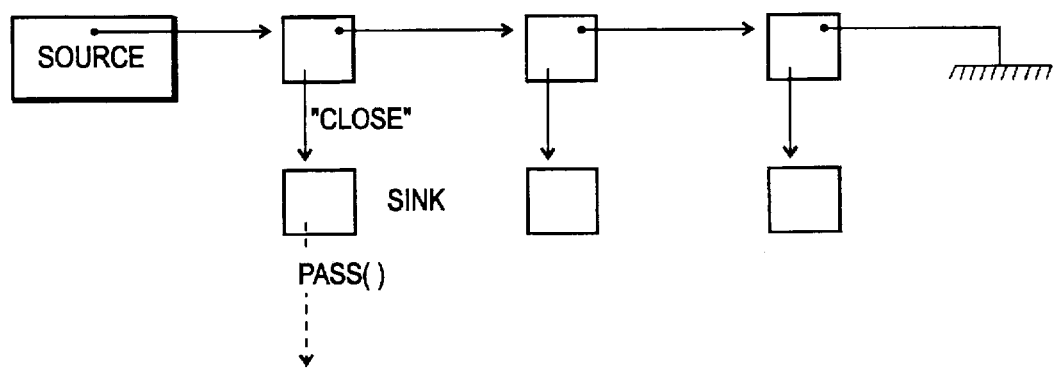
FIG. 8 is a block diagram illustrating event chains in the system of the present invention, which are constructed by connecting an event source to a chain (linked list) of none or more event sinks.

Event chains in the system are constructed by connecting an event source to a chain (linked list) of none or more event sinks. The last event sink in the chain provides closure. The overall process is illustrated in FIG. 8. When an event arrives at a particular event sink it may be acted upon (e.g., by invoking a particular handler). Alternatively, the event sink may elect to "pass" the event to the next in line of the chain, adding any state information desired at this point. The PME programming model of the present invention, therefore, provides a technique for characterizing a component using only its properties, methods, and events in such a way that a user of the component does not have to know the class of the object (and its inner workings) in order to appropriately employ it.

Implementation of Context-free Reusable Software Component in C++ with the Property-Method-Event Model A. PME Programming Model Context-fee reusable software components are implemented using a Property-Method-Event (PME) programming model of the present invention. In the PME model, "properties" and "methods" become the inputs to a component and "events" become the output from a component. Methods, which are supported directly by C++, impart behavior to a component in that they cause the component to perform some operation or action, such as asking an object or component to do something, including, for example, "move yourself," "paint yourself," or the like. Properties and events are not supported directly by C++. Accordingly, it is necessary to synthesize support for them, within the confines of standard C++.

B. Property Input

A property is a value or state associated with a component. Examples of properties include things which have a single value, such as color, shape, border style, and the like. Typically in C++, properties are simply variables whose values can be directly "read" or "written" to. Such an approach, however, is not very useful in real-life applications. More particularly, instances arise where it does not suffice to represent a property simply by storing a value; instead, it may be necessary to undertake an action, such as calculating the then-current value for a property, each time the property is accessed.

Consider the task of changing the color (i.e., color property) of an object, for instance. One can easily conceive of an object having an integer variable for storing a color property and a method for setting this variable. However, merely storing a new value (e.g., integer comprising a color code) in a variable does not serve to change the color of the object. Instead, an action occurs to update the property by not only examining the new color code but undertaking steps to process that new property value, for example by repainting the object with the new color code. Changing a property may also require the examination and validation of other properties of the object, all before undertaking necessary steps for changing its color property (e.g., re-painting itself). It is clear, therefore, that simply storing values of properties in variables generally does not serve to change the "property" of an object.

All told, a virtually universal need exists to have an "action" associated with the change of the value of a property. If one changed the color of a visible object on screen, for instance, this needs to be reflected in the display of the object (i.e., the action of repainting the object with the new color should occur). Thus, properties, like methods, generally need to impart "behavior" to an object. There is no direct support for this in C++, however. Moreover, by providing access to an internal "property" variable in a component, the internal implementation of the component is being exposed directly to its users. The unfortunate consequence of that approach is that the variable must be kept in exactly the same location (offset) inside the component at all times.

C. C++ Implementation of a Property mechanism

As described above, in C++ one is generally forced to dispense with the notion of properties in any real sense. Instead, one must resort to providing access to properties of an object through hand-coded "getter" and "setter" methods. In accordance with the present invention, therefore, it is desirable to provide direct property-programming support implemented within the confines of standard C++—support which is simple to understand and thus easy to maintain.

The notion of "properties," in accordance with the present invention, is a function-call mechanism associated with properties. This mechanism operates such that the task of setting a property of an object leads to an action. For instance, the step of setting an object to the color red:

Object.color=RED leads to an action (method invocation) for changing the objects color property to red. This means, in other words, that a method or routine (e.g., SetColor method) of the object is invoked.

By the same token, the act of getting a property:

X=Object.color also leads to an action. Although it may suffice under certain circumstances to simply "read" a variable, this is not necessarily always the correct approach. As previously outlined, the property may be, for instance, a computed value. The color might not be a single value but, instead, be computed from RGB values—three separate values. Accordingly, in the system of the present invention, property access typically leads to an action. Stated generally, the task of getting and setting properties leads to an action.

For the example of the property of color, this results in the task of setting a color leading to the invocation of a SetColor method, and the task of getting a color leading to the invocation of a GetColor method. The GetColor method typically returns a color (whatever it is). A SetColor routine, on the other hand, typically takes one or more color parameters and returns a new color (whatever it is).

A typical call for setting the color of a screen button (e.g., cancel button) might, without further enhancement, appear as follows:

CancelButton->setColor(OkButton->setColor(Form->getDefaultColor( )));

This is difficult to understand and, hence, difficult to maintain. Therefore, it is desirable to simplify the foregoing example by replacing access method calls with simple assignment operations, as follows:

OkButton->Color=CancelButton->Color=Form->DefaultColor;

In an exemplary environment, two macros are defined for simplifying property-style programming. The first macro, PROPERTY, handles properties which are "atomic"; an atomic property is one which does not have any other properties (or any properties which are desired to be exposed). The second macro, OBJ_PROPERTY, handles properties which are themselves objects which expose other properties. The two macros may be constructed as follows:

```
#define OUTER(cls,name,ptr)((cls*)(((char*)ptr)-int(&(((cls*)0)->name))))
#define PROPERTY(cls,name,type)\
protected:\
virtual type get##name( );\
virtual type set##name(type);\
public:\
struct t##name\
{\
    operator type( )         { return OUTER(cls,name,this)->get##name( ); };
\
    type operator = (type a) { return OUTER(cls,name,this)->set##name(a); };
\
}name;\
friend struct t##name
#define OBJ_PROPERTY(cls,name,type)\
protected:\
virtual type get##name( );\
virtual type set##name(type);\
public:\
struct          t##name\
{\
    type operator->( )       { return OUTER(cls,name,this)->get##name( ) };
\
    operator type( )         { return OUTER(cls,name,this)->get##name( ) };
\
    type operator = (type a) { return OUTER(cls,name,this)->set##name  };
                             (a);
\
} name;\
friend struct t##name
```

Use of these macros is perhaps best explained by way of example.

Consider two C++ classes, TStyle and TObject. Each may be constructed as follows:

```
class TStyle{
    PROPERTY(TStyle,Color,int);
    PROPERTY(TStyle,Font,char*);
    private:
    int color;
    char* font;
};
int TStyle: :getColor( ){ return color;}
int TStyle: :setColor(int a){ return color = a;}
class TObject{
    OBJ_PROPERTY(TObject,Style,TStyle*);
    TObject( ){style = new TStyle;}
    private:
    TStyle* style;
};
Tstyle * TObject: :getStyle( ){ return style;}
Tstyle * TObject: :setStyle(Tstyle * a){ return style = a;}
```

As shown, properties which are objects are defined as a pointer-to-class, and the getters and setters return a pointer-to-class. The parameter for the setter is also a pointer-to-class.

The following demonstrates use of the above classes for setting properties:

```
main( ){
    TObject* Object = new Tobject;
    Object->Style->Color = 123;
    Object->Style->Font = "Courier";
    int i = Object->Style->Color;
    char* f = Object->Style->Font;
```

```
    printf("Color: %I,Font: %s\n",i,f);
    printf("Color: %I,Font: %s\n",Object->Style->Color,f);
    // compile error
    printf("Color: %I,Font: %s\n",int(Object->Style->Color),f);
    // OK
    delete Object;
    return 0;
}
```

The approach requires that the compiler be able to apply the necessary type-conversion operator to a property. For instance, at line 8 in the example above, the compiler issues an error since it does not know the type of the second parameter. Accordingly, a type cast must be used as shown in line 9. The macros can be further enhanced by using C++ templates and replacing inline methods with virtual methods inside the nested classes defined by the macros.

The foregoing approach employed macros to provide "syntactic sugar" for property access. One thing is missing, however, since there is no support for treating a property as a value-entity—that is, something that could have been passed as a parameter to a method which uses it as a property, with appropriate invocation of the property's getters and setters in a polymorphic manner. This can be remedied by extending the above mechanism as follows:

```
// This defines property macros where properties are objects which can be
// passed by reference to methods; with invocation of
// getters and setters at the time of reference
template <class T>struct TPROPERTY{
    virtual operator T( ) = 0;
    virtual T operator = (T a) = 0;
};
template <class T>struct TOBJ_PROPERTY: TPROPERTY<T>{
    virtual T operator->( ) = 0;
};
#define PROPERTY(cls,name,T)\
    virtual T get##name( );\
    virtual T set##name(T);\
    struct         t##name: TPROPERTY<T>\
    {\
    operator T( )              { return OUTER(cls,name,this)->get##name( };\
                               );
    T operator = (T a)         { return OUTER(cls,name,this)->get##name };\
                               (a);
    } name;\
    friend struct t##name
#define OBJ_PROPERTY(cls,name,T)\
    virtual T get##name( );\
    virtual T set##name(T);\
    struct         t##name: TOBJ_PROPERTY<T>\
    {\
            operator T( )      { return OUTER(cls,name,this)->get##name( ); };\
            T operator->( )    { return OUTER(cls,name,this)->get##name( ); };\
            T operator = (T a){
            return OUTER(cls,
            name,this)-
            >set##name(a);};\
    } name;\
    friend struct t##name
```

Clearly, defining properties in this manner is slightly more "expensive" than in the previous example. Properties now have non-zero size (they are the size of a vtable pointer) and the inline accessor methods are now virtual methods. However, the approach now allows properties to be passed as parameters.

Given these templates and macros, one can now employ PROPERTY as follows:

```
struct MyClass{
PROPERTY(MyClass,Color,int);
PROPERTY(MyClass,Size,int);
};
int Test(TPROPERTY<int>arg){      // arg is any property of type int
    // Note that this function does not have to know the class
    // from which the property argument comes
    arg = 123;                    // calls setter
    return arg*10;                // calls setter
}
main( ){
    MyClass Obj;
    test(Obj.Color);              //one property of type int
    test(Obj.Size);               //another property of type int
    return 0;
}
```

It is not clear that the cost of this generalization of properties is worth the benefit. The design described above is offered primarily for the sake of completeness.

D. Event Output

The output of a software component takes the form of an event notification originated by the component. Such an event notification is a call-back from the component to the user of the component. This "user" is, for purposes of the following discussion, itself a component. This call-back should therefore be directed from the component to a method of the user-component. In many practical programming situations there may be several concurrent receivers of the events issued by a component. For purposes of the following discussion, the abbreviated term "event" is used to refer to such event notification call-backs from a component to its user(s).

Events can be synchronous, for example events which are issued as a result of the processing of a method-call or a property-access call. Events can also be asynchronous, occurring at any time. Examples of components which issue asynchronous events include system-timers and user-interface components such as buttons, toolbars, and menus.

Event call-backs must, of course, be handled in a completely type-safe manner. In order for a component to be context-free, the component should not need to have any knowledge of the class of the object which will receive and handle its event notifications. In the absence of any C++ language support for events, a type-safe "wiring" mechanism must be designed—one using standard C++ to dispatch an event, raised by one object (the "event source"), to a method of another object (the "event sink"), with the requirement that the event source does not need to know the class of the event sink.

E. Implementation of an Event mechanism (1) Overview

In "flat" C-language, with no objects, call-backs can be handled with simple function-pointers. When the call-back is from one object to another, as it is in the case of components, the use the C++ pointer-to-member facility is at first suggested. However, the resulting design is much more costly both in terms of space and performance than the chosen design, which will be explained next.

Establishing type-safe connections between event sources and event sinks, in such a way that the event-source objects need to have no knowledge of the event sinks, is perhaps best explained by way of example. Consider, for example, how one connects an event Click from an object of class Button to a method OnClick in a class Form. The event used in the example happens to take one parameter of type int and has no return-value. The example will later be generalized for events with any number of arguments of arbitrary type.

(2) Defining an Event Source

The following avoids the use of macros or templates in order to clarify the mechanism used to connect events to event handlers. Later, templates and macros are introduced which facilitate the use of this mechanism.

Two data structures are used in implementing the event mechanism. These structures specifically define an event with a single argument of type int.

```
struct EVENT_SINK_Int{
    void(*pFn)(EVENT_SINK1_int*,int);
};
struct EVENT_SOURCE_int{
    EVENT_SINK_int *pSink;
    void operator( )(int i){
        if(pSink)(pSink->pFn)(pSink,i);
    }
    void operator = (EVENT_SINK_int &Sink){
        pSink = &Sink;
    }
    EVENT_SOURCE_int( ):pSink(0){ }
};
```

As shown, the event sink is an object with a single data-member—a function-pointer. This points to a function which takes two parameters: a pointer to an event sink and an int. The latter is, as we shall see, the int parameter for the event. The event source also has a single data-member, a pointer to an event sink. It also defines operator ( ) (int) as an inline method, which makes a call through the event sink's function pointer (if non-NULL), passing the address of the event sink and the integer argument as shown.

The event source also implements operator=(EVENT_SINK_int&) which takes a reference to an appropriately typed event sink and initializes the event sink pointer, as shown. Finally, the event source has a constructor which initializes the event sink pointer to NULL, to prevent a call through an illegal pointer.

A class Button may be defined as the source of the event Click:

```
struct Button{
    EVENT_SOURCE_int Click;
};
```

To give this class an event Click, say, an instance Click of class EVENT_SOURCE_int is simply defined. Note that the definition of this class makes no assumptions whatever about the eventual user of instances of the class. Specifically, the class Form which will be defined later as a receiver of an event from the Button class is not mentioned anywhere in this definition.

Given an instance OkButton of the class Button, the event Click for this instance can be "fired" by the following call:

```
OkButton.Click( );
```

This invokes operator ( ) (int), resulting in a call to the function pointed to by the event sink's function pointer, pFn.

(3) Defining an Event Sink

Recall that an event sink is an entity which can be connected to an event source in order to dispatch an event to an event handler. This will now be illustrated for a class, Form, which contains a button and wishes to process the "Click" event from the button:

```
#define OUTER(cls,name,ptr)((cls*)(((char*)ptr)-int
    (&(((cls*)0)->name))))
struct form{
    button B1;
```

```
    struct SinkOnClick: public EVENT_SINK_int{
        static void DoIt(EvelntSinkInt*pSink,int I){
            OUTER(form,_OnClick,pSink)->OnClick(i);
        }
        SinkOnClick( ){pFn = &DoIt;}
    }_OnClick;
    virtual void OnClick(int);
    form( ){
        B1.Click = _OnClick;
    }
};
void Form: :OnClick(int arg){
    ...
};
```

As shown (momentarily ignoring the macro OUTER), the form contains an instance B1 of class Button. The button has an event source Click, as described above. This event gets connected to the method Form:: OnClick as follows. The form contains an event sink object named _OnClick, defined by the nested class SinkOnClick, which is derived from the class EVENT_SINK_int. The nested class contains a static function DoIt, with the same signature as the inherited function pointer, pFn. The constructor for SinkOnClick initializes pFn to point to DoIt. The constructor for Form initializes B1.Click.pSink to point to _OnClick, by use of B1.Click's operator=, as shown. Consequently, any subsequent execution of B1.Click( ... ) will result in a call to SinkOnClick::DoIt.

Inside the implementation of DoIt, the macro OUTER comes into play. The macro computes the offset of the object _OnClick inside the class Form. It then subtracts this offset from the address of _OnClick which is passed in the parameter pSink. The result is a pointer to the top of the form-object. This pointer can now be used to invoke the method OnClick, as shown. The invocation of B1.Click ( ) results in a type-safe call to Form::OnClick, without the need for the class Button to know anything about the class receiving the event.

(4) Templates and Macros for Event Programming

Use of the foregoing mechanism can be facilitated by using templates and macros, for achieving a more convenient coding style:

```
#define OUTER(cls,name,ptr)((cls*)(((char*)ptr)-int(&(((cls*)0)
->name))))
#define ATTACH(evt,sink)evt = _##sink
typedef void event_handler;
//------------------------------------------------
//Templates and macros for events with one argument
//------------------------------------------------
template <class T1>struct S_EVENT_SINK1{
    event_handler(*pFn)(S_EVENT_SINK1*,T1);
};
template <class T1>struct S_EVENT_SOURCE1{
    S_EVENT_SINK1<T1>*pSink;
    event_handler operator( )(T1 v1){
        if(pSink)(pSink->pFn)(pSink,v1);
    }
    void operator = (S_EVENT_SINK1<T1>&Sink)}
        pSink = &Sink;
    }
    S_EVENT_SOURCE1( ):pSink(0){ }
};
#define EVENT_SOURCE1(name,T1)\
    S_EVENT_SOURCE1<T1>name
#define EVENT_SINK1(cls,name,T1)\
struct hdlr_##name: public S_EVENT_SINK1<T1>{\
    hdlr_##name( ){pFn = &DoIt;}\
    static event_handler DoIt(S_EVENT_SINK1<t1>*pSink,T1 v1){\
        OUTER(cls,_##name,pSink)->name(v1);\
    }\
```
```
    }_##name;\
    friend class hdlr_##name;\
    virtual event_handler name(T1)
```

Here, the classes S_EVENT_SINK_int and S_EVENT_SOURCE_int is replaced with template classes which support events with one argument of any type. Those skilled in the art will appreciate that this can be extended to a set of templates for EVENT_SINKnn and EVENT_SOURCEnn for events with nn number of arguments.

The macros EVENT_SOURCE1 and EVENT_SINK1 are also defined for use in declaring event sources and event sinks with one argument. Again, additional macros for declaring events with nn arguments can be provided. There is also a macro ATTACH which makes the attachment of events more readable. Finally, event_handler is a typedef or void, simply to make the event handlers easily identifiable.

Using the above results in a much improved coding style:

```
struct button{
    EVENT_SOURCE1(Click,button*);
};
struct form{
    button B1;
    EVENT_SINK1(form;OnClick,button*);
    form( ){
        ATTACH(B1.Click,OnClick);
    }
};
event_handler Form: :OnClick(int arg){
    // ...
};
```

This approach results in code which is a lot more readable and, thus, usable. Those skilled in the art will appreciate that templates and macros similar to these may be created, in accordance with the teachings of the present invention, to define event sources and event sinks with an arbitrary number of arguments of arbitrary type.

The foregoing approach does not specify whether event handlers have return values. Return values can be employed or not, depending on the needs of the particular implementation. Note, however, in some cases there might be many chained event handlers for a given event, leading to complications if a return value is used. Preferably, therefore, events should employ reference parameters when event sources expect that event sinks return data in some form.

(5) One-To-Many and Many-To-One Event Support (a) General

Often it is useful to have a single event handler for many events. If a form has several buttons, for example, it often is preferable to create a single event handler for all the buttons in that form. In that case, one would need to know which of the buttons triggers a particular call to this shared event handler. In a preferred embodiment, the following convention is employed for all events: The first parameter for all events should be a reference (or pointer) to the object which is the source of the event.

Similarly, it is often desirable to have several event handlers for a single event. One scenario which requires this is when events are used to keep several views of a single set of data updated as the data changes. This will, for example, happen when several development tools, such as a forms-designer, a source-code window, and an object inspector are viewing the same physical object. The basic design just described can be extended to support both many-to-one and one-to-many events and/or handlers.

(b) Event chains

An event chain is formed when more than one event handler exists for a single event. When that is the case, the following issues need to be addressed and appropriate semantics defined:

(1) In what order do the event handlers get called?
(2) Can a handler modify the parameters associated with the event in order to filter or translate the event in some way, before the event is processed by the other handlers?
(3) Can a handler block an event from being seen by the other handlers?
(4) Can a handler do processing before the event has been processed by the other handlers? Or after? Or both?

(c) Sequence of event processing

In a preferred embodiment, events are processed in opposite order of attachment—that is, the most recently attached event handler is called first. This provide a convenient and "natural" order of event processing which matches the scoping rules of C++. Alternatively, a "priority" parameter can be added to the ATTACH call to help control the order of event handler sequencing.

(d) Event Pass/Block mechanism

An event handler, when called, performs an active Pass ( . . . ) call to pass the event to the next handler(s) in the chain. This addresses the above issues in a simple, yet flexible manner, as follows. First, the entry to a given event handler takes place before the processing of any event handlers attached prior to this handler. This supports pre-processing of an event. If a Pass call is issued within an event handler, control returns to the handler after all the following handlers, if any, have been given a chance to process the event. This supports post-processing of an event. If a Pass call is not issued, then the event is blocked from all following event handlers. The Pass call allows the parameters of the event to be changed (filtered), if so desired. When an event handler is the last (or only) event handler in an event chain, Pass ( ) has no effect. In a preferred embodiment, therefore, the convention adopted is that all event handlers always Pass the event unless the event is specifically to be blocked.

(6) Templates and Macros for one-to-many and many-to-one Event Programming

Figure 9:
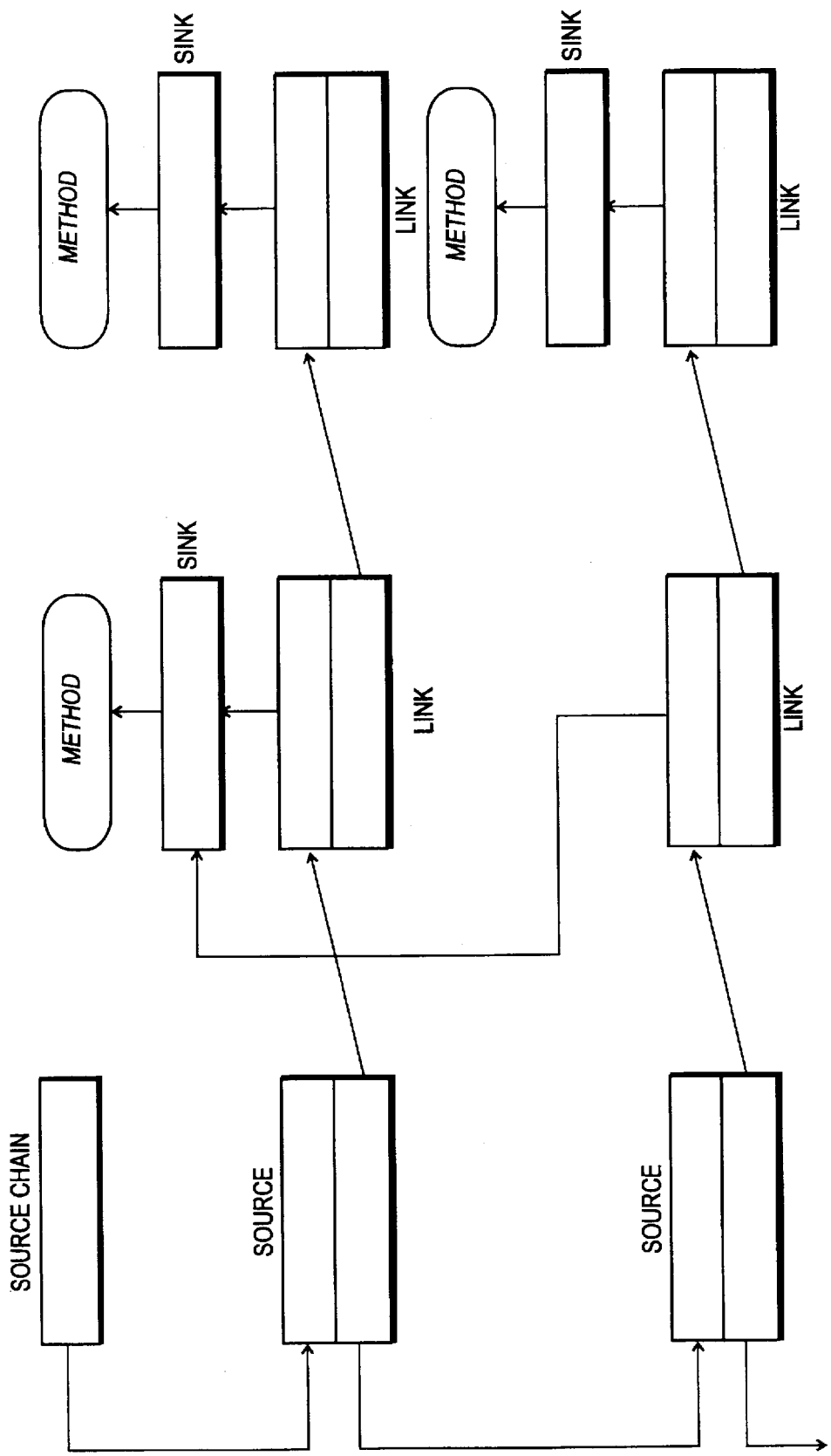
FIG. 9 is a block diagram illustrating templates and macros of the present invention, which may be defined for supporting one-to-many and many-to-one events.

With reference to FIG. 9, templates and macros may be defined for supporting one-to-many and many-to-one events. These are somewhat more complex. In order to manage the one-to-many and many-to-one relationships between event sources and event sinks, the notion of event links is introduced.

The templates and macros make reference to the following struct and three flat helper-functions which help manage the creation and destruction of event links:

```
struct S_EVENT_SOURCE;
void NewEventSrc(S_EVENT_SOURCE *);
void DeleteEventSrc(S_EVENT_SOURCE *);
void DetachEVENT_SINK(S_EVENT_SOURCE *,void*);
struct S_EVENT_SOURCE{
    S_EVENT_SOURCE * pEventSrc;
    S_EVENT_SOURCE( ):pEventSrc(0){NewEventSrc(this);}
    ~S_EVENT_SOURCE( ){DeleteEventSrc(this);}
};
//----------------------------------------------------
// Templates and macros for events with one argument
//----------------------------------------------------
template <class T1>struct EventLink1;
template <class T1>struct S_EVENT_SINK1{
    event_handler(*pFn)(EventLink1<T1>*,T1);
    S_EVENT_SINK1( ) :pFn(0){ }
    ~S_EVENT_SINK1( ){DetachEVENT_SINK(0,this);}
};
template <class T1>struct EventLink1{
    S_EVENT_SINK1 <T1>* pSink;
    EventLink1 * pLink;
    event_handler operator( )(T1 v1){
        if(pLink)(pLink->pSink->pFn)(pLink,v1);
    }
    EventLink1(EventLink1 *1,S_EVENT_SINK1<T1>*s):pLink(1),pSink(s){ }
};
template <class T1>struct S_EVENT_SOURCE1: public S_EVENT_SOURCE{
    EventLink1<T1>*pLink;
    event_handler operator( )(T1 v1){
        if(pLink)(pLink->pSink->pFn)(pLink,v1);
    }
    S_EVENT_SOURCE1( ):pLink(0){ }
    void operator = (S_EVENT_SINK1<T1>&Sink){
        pLink = new EventLink1<T1>(pLink,&Sink);
    }
};
#define EVENT_SOURCE1(name,T1)\
    S_EVENT_SOURCE1<T1>name
#define EVENT_SINK1(cls,name,T1)\
    struct hdlr_##name: public S_EVENT_SINK1<T1>{\
        hdlr_##name( ){pFn = &DoIt;} \
        static event_handler DoIt(EventLink1<T1>*pLink,T1 v1){\
            OUTER(cls,_##name,pLink->pSink)->name(*pLink,v1);\
        }\
    }_##name;\
    typedefEventLink1<T1>& Next##name;\
    friend class hdlr_##name;\
    virtual event_handler name(EventLink1<T1>&,T1)
```

Event links are automatically created and destroyed as needed. When event sources or event sinks are destroyed, they are automatically disconnected from their attached sinks/sources. Note particularly that event handlers now have a new first parameter. This is a reference to an object (i.e., an "event link") which can be used to pass the event to other handlers, if any, in a thread-safe manner.

For a given event sink MySink, say, the EVENT_SINKnn macros define a typedef NextMySink which should be used to specify the first parameter of every event handler. This parameter can be named anything the programmer wishes, such as Pass. If an event is not passed using this event-link parameter, the event is blocked from any following handlers. Therefore, unless a handler deliberately wishes to block an event, it should terminate with a Pass ( . . . ); statement.

F. Example use

An example of user code follows. For purposes of illustrating preferred coding style, a simple example is illustrated. First, the following is defined: a component of class button with one input, the method DoClick( ), and one output, the event Click. The DoClick method simply fires the Click event:

```
struct button{
    EVENT_SOURCE1(Click,button*);
    int DoClick( ){Click(this);}
};
```

Next, the following is defined: a component of class form, containing two buttons (OK and CANCEL) and a single event sink (OnClick) to handle the click event from both of these buttons. The class form also defines three events FormOpen, FormClose and FormCancel:

```
struct form{
    button OK;
    button CANCEL;
    EVENT_SINK1(form,OnClick,button*);
    EVENT_SOURCE1(FormOpen,form*);
    EVENT_SOURCE1(FormClose,form*);
    EVENT_SOURCE1(FormCancel,form*);
    form( ){
        ATTACH(OK.Click,OnClick);
        ATTACH(CANCEL.Click,OnCloick);
    }
    int Test( );
};
int form: :Test( ){
    FormOpen(this);          //issue FormOpen event
    CANCEL.DoClick( );       //click the CANCEL button
    FormOpen(this);          //issue FormOpen event
    OK.DoClick( );           //click the OK button
    return 0;
}
event_handler form: :OnClick(NextOnClick Pass,button * B){
    if(B==&OK){              //we have Click from OK button
        FormClose(this);     //issue FormClose event
    }else{                   //we have Click from CANCEL button
        FormCancel(this);    //issue FormCancel event on
    }
    Pass(B);
}
```

The OnClick handler simply fires the event FormClose when a click is received from the OK button and fires the event FormCancel when a click is received from the CANCEL button. The handler terminates with a Pass ( ) call, since a future version of the button class may hook its own Click event to perform some default processing. The method form::Test simply fires a FormOpen event, followed by a call to CANCEL.DoClick( ) to simulate a click on the CANCEL button. It then issues a second FormOpen event, followed by a simulated click on the OK button.

An "application" component which makes use of a form component may be constructed as follows:

```
struct application{
    form F1;
    EVENT_SINK1(application,OnOpen,form*);
    EVENT_SINK1(application,OnClose,form*);
    EVENT_SINK1(application,OnCancel,form*);
    EVENT_SINK1(application,OnClick,button*);
    application( ){
        ATTACH(F1.FormOpen,OnOpen);
        ATTACH(F1.FormClose,OnClose);
        ATTACH(F1.FormCancel,OnCancel);
        ATTACH(F1.OK.Click,OnClick);    //NOTE
    }
    int Run( ){
        return F1.Test( );
    }
};
```

This component defines four event sinks, three of which (OnOpen, OnClose and OnCancel) handle events from the form. The fourth one is designed to intercept events from the OK button inside the form.

```
event_handler application: :OnOpen(NextOnOpen Pass,form *F){
    ...                 //process opening of F1
    Pass(F);
}
event_handler application: :OnClose(NextOnClose Pass,form *F){
    ...                 //process closing of F1
    Pass(F);
}
event_handler application: :OnCancel(NextOnCancel Pass,form *F){
    ...                 //process cancelling of F1
    Pass(F);
}
event_handler application: :OnClick(NextOnClick Pass,button*B){
    if(. . . ){         //test some condition
        return;         //block event
    }else{
        Pass(B);        //pass to form
    }
}
main( ){
    application App;
    return App.Run( );
}
```

In the the above example of a one-to-many event situation, the application component has "reached into" the form component and has attached its own event handler to the form's OK button. In the implementation of application::Onclick, the application may test for a desired condition in order to decide whether to pass the event through to the form, or to block the event by not passing the event.

F. Event-link helpers

Event-link management helpers can be constructed as follows:

```
#include "closure.h"
S_EVENT_SOURCE * EventChain = 0;
int EvCount = 0;
void NewEventSrc(S_EVENT_SOURCE * pSrc){
    pSrc->pEventSrc = EventChain;
    EventChain = pSrc;
    EvCount++;
}
void DeleteEventSrc(S_EVENT_SOURCE * pSrc){
    EVENT_LINK1<int>**pp,*p;
    S_EVENT_SOURCE * * ppSrc = &EventChain;
    while(ppSrc && *ppSrc){
        if(*ppSrc == pSrc){
            *ppSrc = pSrc->pEventSrc;
            pp = &((S_EVENT_SOURCE1<int>*)pSrc)->pLink;
            while((p = *pp) != 0){
                *pp = p->pLink;
                delete p;
            }
            EvCount--;
            return;
        }else{
            ppSrc = &((*ppSrc)->pEventSrc);
        }
    }
}
void DetachEventSink(S_EVENT_SOURCE * pSrc,void *pSink){
    if(pSrc){
        EVENT_LINK1<int>*pLink1 ** ppLink =
            &((EVENT_LINK1<int>*)((S_EVENT_SOURCE1<int>*)pSrc)->pLink);
        while(ppLink&&((pLink = *ppLink) != 0)){
            if(&(pLink->Sink) = = pSink){
                *ppLink = pLink->pLink;
                delete pLink;
            }else{
                ppLink = &(pLink->pLink);
            }
        }
    }else{
        // if called with NO event source,process all event sources
        pSrc = EventChain;
        while(pSrc){
            DetachEventSink(pSrc,pSink);
            pSrc = pSrc->pEventSrc;
        }
    }
}
```

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system, a method for creating context-free C++ software components which are executable by a computer program operating on said computer system, the method comprising:

creating from a first C++ class a first component having an event source, said first C++ class comprising class data members and class methods operative on said data members, said event source comprising an event which occurs in said first component at runtime;

creating from a second C++ class a second component having an event sink, said second C++ class comprising class data members and class methods operative on said data members, said event sink comprising an event handler for processing said event which occurs in said first component at runtime, said second component being unaware of said class data members and class methods which comprise said first class;

connecting said event source to said event sink by performing substeps of:

(i) storing in said second component a pointer to a dispatcher method in said second component, said dispatcher method capable of invoking said event handler;

(ii) storing in said first component at runtime a pointer to said pointer to said dispatcher method, so that said dispatcher method can be invoked by said first component at runtime; and upon occurrence of said event in said first component at runtime, invoking by said first component said dispatcher method of said second component, whereupon said dispatcher method invokes said event handler for runtime processing of said event.

2. The method of claim 1, wherein said dispatcher method comprises a static member function of said second C++ class.

3. The method of claim 2, wherein said static member function resides at a known offset within said second component when said second component is created.

4. The method of claim 1, wherein said dispatcher method includes at least one call to a virtual member function of the second C++ class, said virtual member function serving as the event handler for said event.

5. The method of claim 1, wherein said step of invoking said event handler of said second component comprises:

determining by said system an offset for said dispatcher method by de-referencing said pointer to said pointer to said dispatcher method; and executing said dispatcher method beginning at said determined offset.

6. The method of claim 1, wherein said step of invoking said event handler of said second component includes invoking said event handler with context information comprising information characterizing the occurrence of said event.

7. The method of claim 1, wherein said connecting step occurs in an early-bound, type-safe manner.

8. The method of claim 1, wherein said first and second components are created in standard C++.

9. The method of claim 1, wherein said substep (i) further comprises:

determining at compile time an address for said dispatcher method in said second component; and storing in said second component as said pointer to said dispatcher method said determined address.

10. The method of claim 1, further comprising:

determining at runtime a memory location for said second component from said pointer to said pointer to said dispatcher method.

11. The method of claim 10, wherein said determining at runtime a memory location comprises:

determining an offset within said second component for said static member function; and determining at runtime a memory location for said second component by subtracting said determined offset from said pointer to said pointer to said dispatcher method, said memory location being the C++ "this" pointer for the second component.

12. In a computer system, a method for creating context-free software objects which are executable by a computer program operating on said computer system, the method comprising:

creating from a first class a first object having a particular event occurring at runtime, said first class defining class data members and class methods operative on said data members;

creating from a second class a second object having at least one event handler, said second class comprising class data members and class methods operative on said data members, said second object including a dispatcher for receiving an event from another object and dispatching that event to an appropriate event handler of said second object, wherein said second object is created from said second class without knowledge of any of the class data members and class methods which comprise said first class;

upon occurrence of a particular event in said first object at runtime, invoking by said first object said dispatcher of said second object;

in response to invoking of said dispatcher, identifying an appropriate event handler of said second object for processing of said particular event; and processing said particular event occurring at said first object by the identified appropriate event handler of said second object.

13. The method of claim 12, further comprising:

connecting said first and second objects together by performing substeps of:

(i) storing in said second object a pointer to the dispatcher in said second object, said dispatcher capable of identifying and invoking an appropriate event handler; and (ii) storing in said first object at runtime a pointer to said pointer to said dispatcher method, so that said dispatcher can be invoked by said first object at runtime.

14. The method of claim 13, wherein said connecting step occurs in an early-bound, type-safe manner.

15. The method of claim 12, wherein said dispatcher comprises a dispatcher function defined by said second class.

16. The method of claim 15, wherein said second class defines said dispatcher function to be a static function, so that the dispatcher function's address is known at compile time.

17. The method of claim 16, wherein said invoking said dispatcher step includes:

computing a "this" pointer of the second object, based on the known address of the dispatcher function.

18. The method of claim 12, wherein said first and second classes comprise C++ classes, and wherein each class is defined without inheriting from the other class.

19. The method of claim 12, wherein said invoking said dispatcher step includes:

passing a "this" pointer of the first object to said dispatcher.

20. The method of claim 12, wherein said pointer of the first object passed to said dispatcher is employed for providing a context comprising information characterizing the occurrence of said event at said first object.

21. The method of claim 12, further comprising:

creating from a third class a third object having at least one event handler, said third class comprising class data members and class methods operative on said data members, said third object including a dispatcher for receiving an event from another object and dispatching that event to an appropriate event handler of said third object, wherein said third object is created from said third class without knowledge of any of the class data members and class methods which comprise either said first class or said second class;

upon completion of processing of said particular event at said second object, invoking by said second object said dispatcher of said third object;

in response to invoking of said dispatcher of said third object, identifying an appropriate event handler of said third object for processing of said particular event; and processing said particular event occurring at said first object by the identified appropriate event handler of said third object.

22. The method of claim 21, further comprising:

creating a plurality of objects from different classes; and connecting the plurality of objects together for forming an object chain for sequentially processing said particular event occurring at said first object.

23. The method of claim 12, wherein said second class is a C++ class, and wherein said dispatcher comprises a C++ static member function of the second C++ class.

24. The method of claim 12, wherein said second class is a C++ class, and wherein said dispatcher includes at least one call to a virtual member function of the second C++ class, said virtual member function serving as the event handler for said event.

25. The method of claim 12, wherein said first and second C++ objects are created in standard C++, without proprietary extensions.

26. A development system for creating context-free, reusable software components, the system comprising:

means for creating source listings, said source listings including program listings specifying:

creating from a first class a first object having a particular event occurring at runtime, said first class defining class data members and class methods operative on said data members, and creating from a second class a second object having at least one event handler, said second class comprising class data members and class methods operative on said data members, said second object including a dispatcher for receiving an event from another object and dispatching that event to an appropriate event handler of said second object, wherein said second object is created from said second class without knowledge of any of the class data members and class methods which comprise said first class;

a compiler for compiling said source listings into an executable program;

means for executing said program, said means including:

means for invoking by said first object said dispatcher of said second object, upon occurrence of a particular event in said first object at runtime;

means, responsive to said invoking means, for identifying an appropriate event handler of said second object for processing of said particular event; and means for processing said particular event occurring at said first object by the identified appropriate event handler of said second object.

27. The system of claim 26, further comprising:

means for connecting said first and second objects together, by:

(i) storing in said second object a pointer to the dispatcher in said second object, said dispatcher capable of identifying and invoking an appropriate event handler; and (ii) storing in said first object at runtime a pointer to said pointer to said dispatcher method, so that said dispatcher can be invoked by said first object at runtime.

28. The system of claim 26, wherein said invoking means includes:

means for passing a "this" pointer of the first object to said dispatcher.

29. The system of claim 26, wherein said dispatcher comprises a dispatcher function defined by said second class.

30. The method of claim 26, wherein said second class defines said dispatcher to be a static function, so that the dispatcher function's address is known at compile time.

\* \* \* \* \*